A. D. SMITH.
AUTOMATIC COUPLING FOR RAILWAY, TRAMWAY, AND OTHER VEHICLES.
APPLICATION FILED MAY 4, 1912.

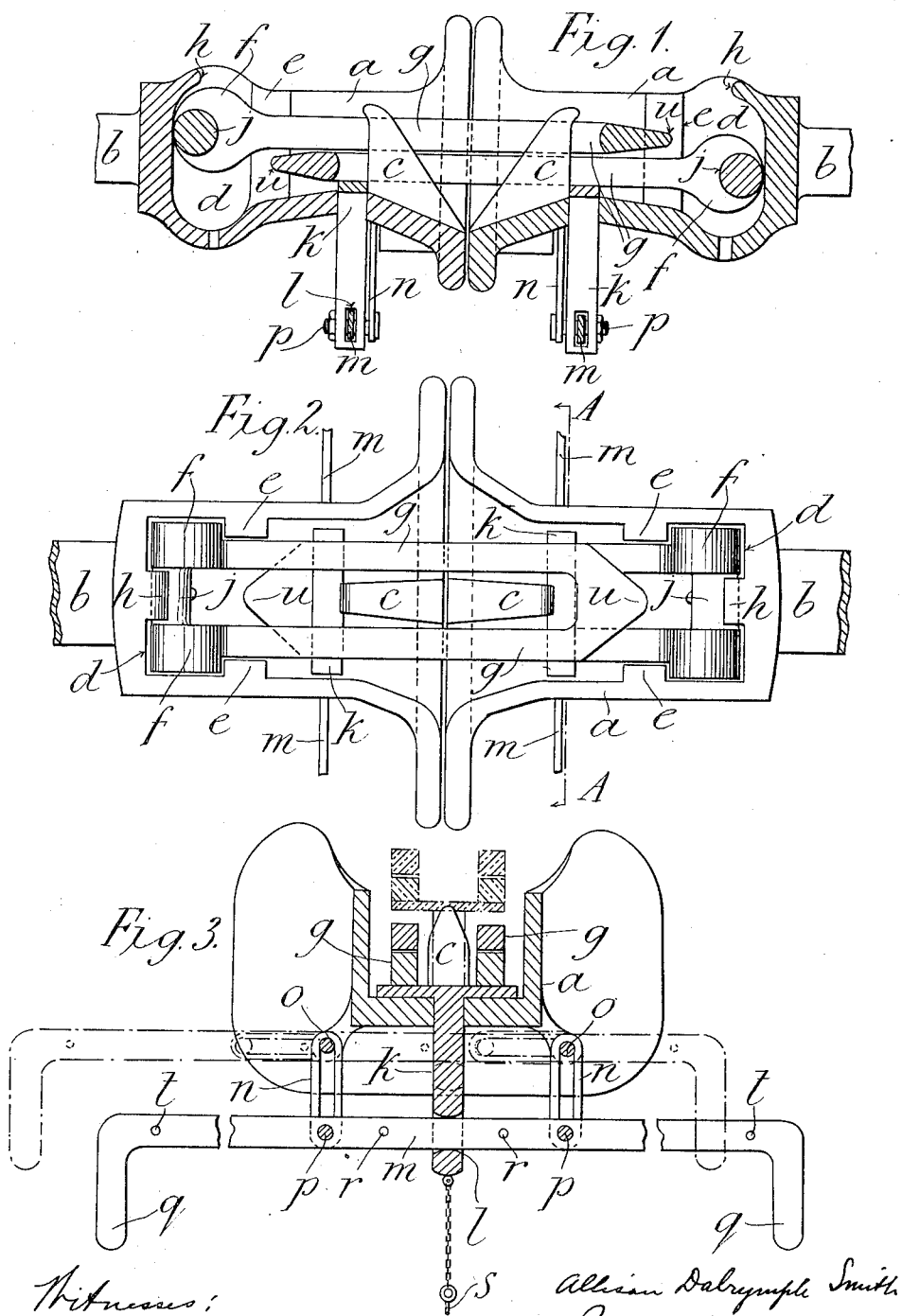

1,084,367.

Patented Jan. 13, 1914.
4 SHEETS—SHEET 2.

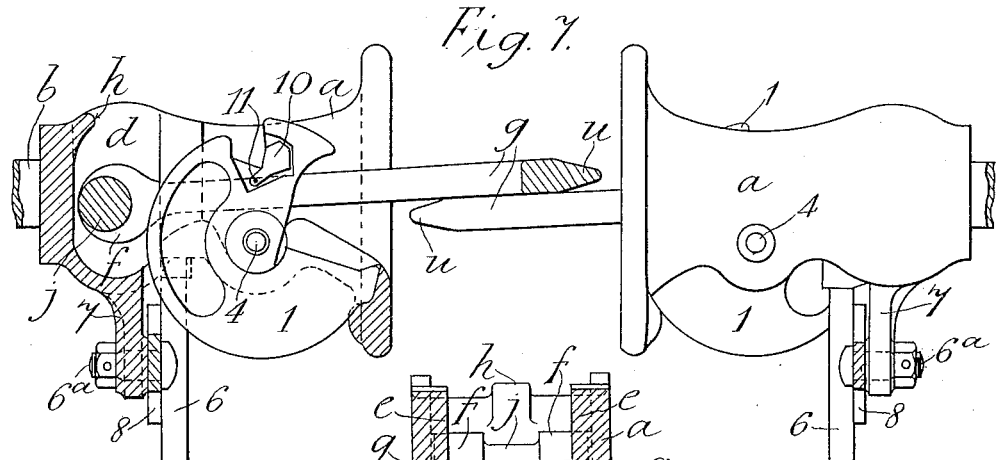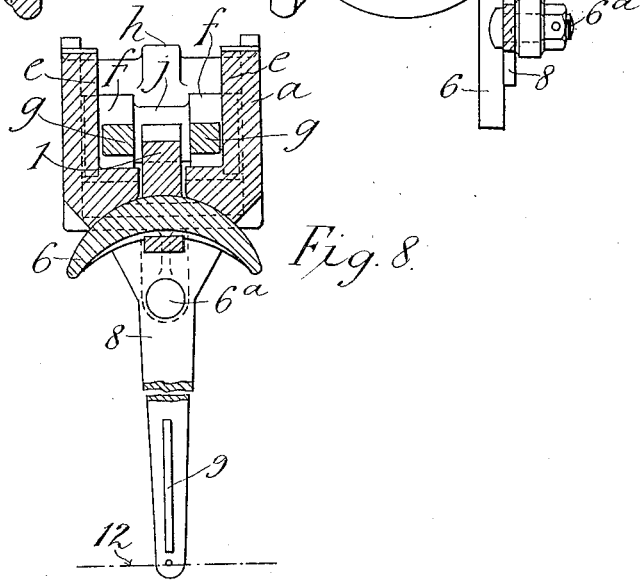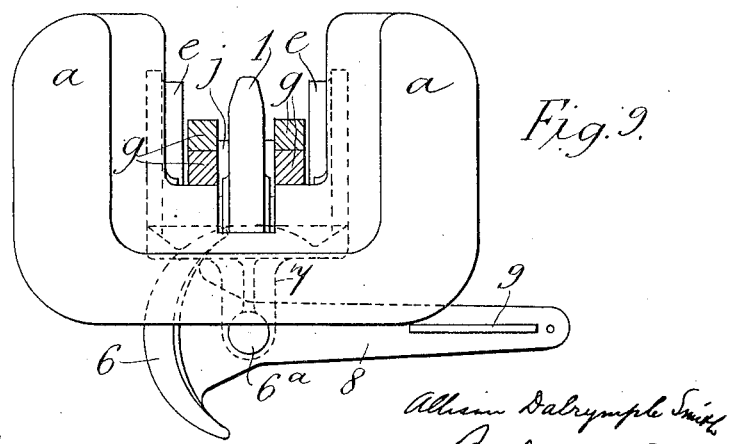

A. D. SMITH.
AUTOMATIC COUPLING FOR RAILWAY, TRAMWAY, AND OTHER VEHICLES.
APPLICATION FILED MAY 4, 1912.

1,084,367.

Patented Jan. 13, 1914.
4 SHEETS—SHEET 4.

UNITED STATES PATENT OFFICE.

ALLISON DALRYMPLE SMITH, OF EDINBURGH, SCOTLAND.

AUTOMATIC COUPLING FOR RAILWAY, TRAMWAY, AND OTHER VEHICLES.

1,084,367. Specification of Letters Patent. Patented Jan. 13, 1914.

Application filed May 4, 1912. Serial No. 695,033.

*To all whom it may concern:*

Be it known that I, ALLISON DALRYMPLE SMITH, a subject of the King of Great Britain and Ireland, residing at Edinburgh, Scotland, have invented Improvements in Automatic Couplings for Railway, Tramway, and other Vehicles, of which the following is a specification.

This invention relates to automatic couplings of the central buffer type for railway, tramway and other vehicles.

The object of the invention is to enable double coupling to be effected whereby two adjacent vehicles may be coupled simultaneously and automatically by means of a link or shackle on each vehicle engaging with the draw-hook upon the other vehicle.

According to this invention the buffer is provided with a draw-hook and with a shackle formed with trunnions fitting into a box or casing in the rear end of the buffer, the mounting of the shackle being such as to permit of considerable vertical movement of said trunnions above and below the central horizontal plane of the buffer, and the arrangement being such that, when coupled, the shackles upon the opposing vehicles lie one upon the other in the same vertical plane.

Means are provided for uncoupling vehicles from either side without necessitating an attendant passing between the vehicles.

Couplings according to this invention are illustrated by way of example in the accompanying drawings.

Figure 4:
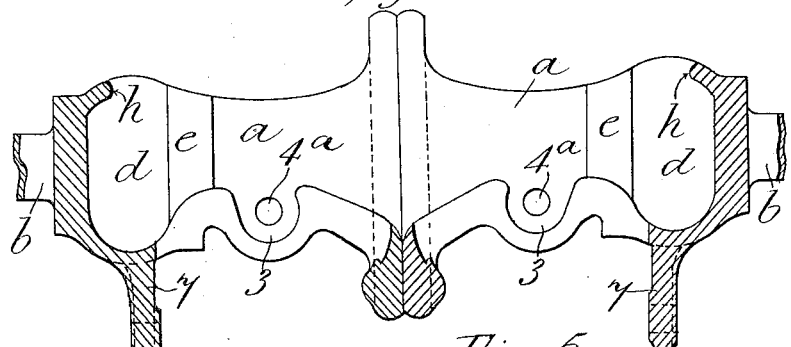
Figure 5:
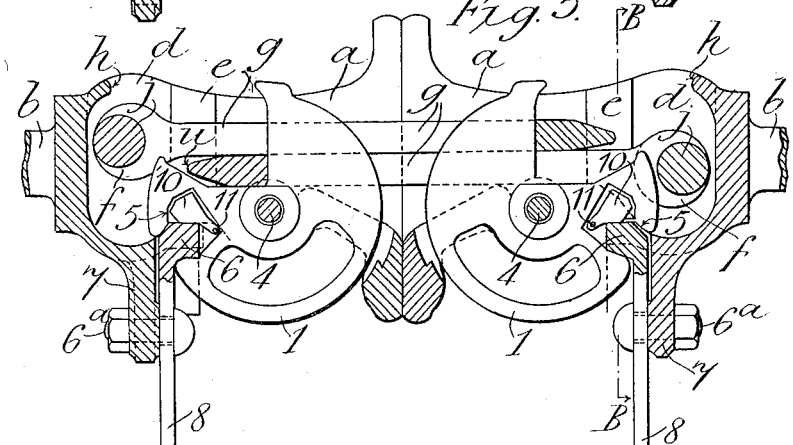
Figure 6:
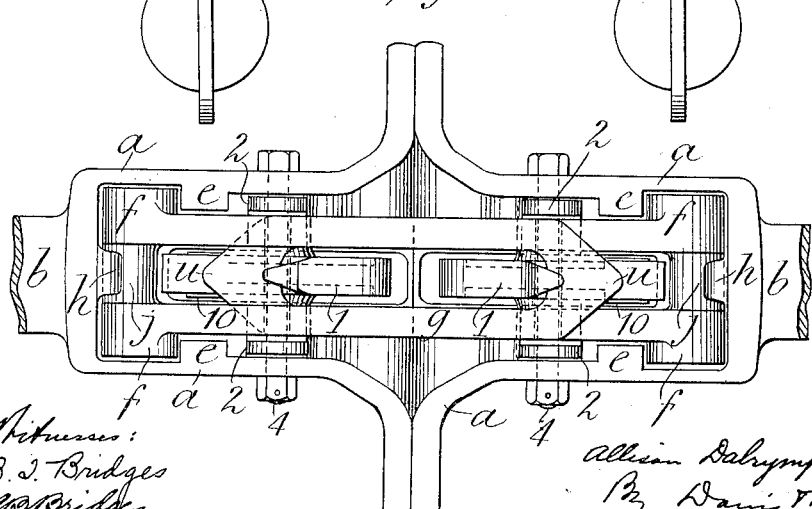
Figure 10:
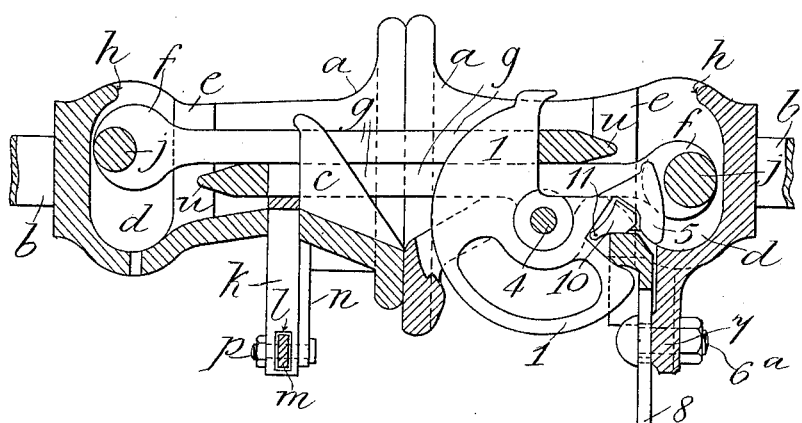
Figure 11:
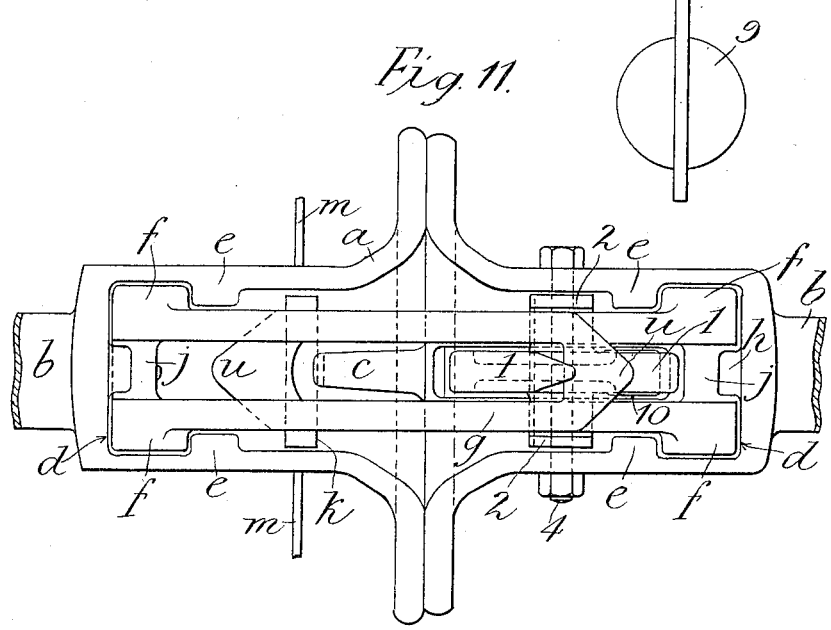

Figure 1 is a longitudinal section of one form of coupling showing the parts in the coupled position. Fig. 2 is a plan of the same, and Fig. 3 is a section on line A A, Fig. 2 showing in dotted lines the position of the parts when the uncoupling gear is operated. Fig. 4 is a longitudinal section of two opposed buffers of another construction of coupling with the coupling mechanism omitted. Fig. 5 is a longitudinal section of a complete coupling showing the parts in the coupled position. Fig. 6 is a plan of Fig. 5. Fig. 7 is a view of two couplings about to engage with one another, the right hand coupling being in elevation and the left hand coupling being in section. Fig. 8 is a section on line B, B, of Fig. 5. Fig. 9 is a front elevation of a coupling showing the link in section and the locking gear in the unlocked position. Figs. 10 and 11 show in longitudinal section and plan the two forms of coupling illustrated in Figs. 1, 2 and 3, and in Figs. 4 and 9, respectively, coupled together.

Referring to Figs. 1, 2 and 3, each buffer $a$ is formed in one with or is connected to the first member $b$ of the draw-gear, and within the buffing face of each buffer $a$ an upwardly projecting tongue $c$ forming the draw-hook is disposed. At the inner extremity of each buffer $a$ there is formed a vertical box or casing $d$ which opens into the hollow neck or shank of the buffer, which, as will be seen clearly in the drawings, is open at the top and said box or casing $d$ of each buffer is provided with inwardly projecting vertically disposed flanges $e, e$ serving as abutments for laterally projecting trunnions $f, f$ formed upon the inner extremity of each coupling shackle $g$. A lug $h$ formed in one with the buffer head projects above the upper open extremity of the casing $d$. The trunnions $f, f$ and the rear extremities of each shackle $g$ are formed in one with a distance piece $j$ disposed eccentrically relatively to said trunnions $f, f$ whereby after the rear end of a shackle $g$ has been inserted within the casing $d$ disengagement therefrom, except when a shackle is projecting vertically, is prevented by engagement of said distance piece $j$ with the lug $h$.

To provide for uncoupling the lower side of each buffer $a$ is slotted at a point in rear of the draw-hook $c$ and through said slot a T-shaped member or lifter $k$ upon which the shackles $g, g$ rest is inserted from within the buffer. The lower extremity of the depending limb of said lifter $k$ is slotted as at $l$, Figs. 1 and 3, and a lifter-bar $m$ is passed therethrough said lifter-bar being suspended loosely by means of a pair of open links $n, n$ taking over pins $o, o$ on the buffer head and pins $p, p$ on the lifter-bar $m$ respectively. At each of its outer extremities said lifter-bar $m$ may be provided with a hand-piece $q, q$ or with a chain or other suitable means for operating same from either side of the vehicle.

Apertures $r, r$ in the lifter-bar $m$ and a pin $s$ may be provided in order to lock said lifter-bar so that when desired the automatic operation of the coupling may be rendered inoperative, and the outer extremities of the lifter-bar may be provided with apertures $t, t$ or the like whereby an attendant may lock, said lifter-bar, by means of a hook or its equivalent attached to the vehicle, without having occasion to enter the space between two vehicles.

By mounting the shackles $g$, $g$ upon trunnions $f$, $f$ within the casing $d$ as described a maximum amount of vertical movement of the pivotal axis of each shackle is permitted without the necessity of weakening the construction of the coupling by forming slots in same.

Normally each coupling link or shackle $g$ lies horizontally within its respective buffer $a$ and when two vehicles approach to be coupled together the tapered outer extremities $u$, $u$ of the links $g$, $g$ meet, and one link (it matters not which) rides over the other until said tapered outer extremities of both links strike the inclined outer faces of the opposing draw-hooks $c$, $c$ over which said links $g$ rise and drop into engagement with said hooks, the one above the other in the same vertical plane, as is seen clearly in Fig. 1; the pivotal axes or trunnions $f$, $f$ upon the rear extremities of the uppermost link or shackle $g$ rising within the box or casing $d$ and permitting said upper shackle to lie parallel with the lower shackle. This freedom of the trunnions in their respective boxes or casings permits the shackles to retain their parallel relationship irrespective of any difference in level of the mutually opposed vehicles whether due to unequal loading or to inequalities of the permanent way.

When it is desired to uncouple the vehicles the lifter bar $m$ on either vehicle and on either side of same is taken by the handpiece $q$ and is slid laterally of the vehicle which movement, through the links $n$, $n$ and pins $o$, $o$ $p$, $p$, produces a parallel motion of the lifter-bar and causes upward vertical movement to be imparted to the lifter $k$ raising same to the position shown in dot-and-dash lines in Fig. 3 and consequently imparting upward angular movement to the outer ends of the overlying shackles $g$, $g$, and raising same clear of the draw-hooks $c$, $c$ as also shown in dot-and-dash lines in Fig. 3, after which the vehicles may be drawn apart. When the lifter bar $m$ has thus been displaced laterally it may be locked in such position by inserting pin $s$ in such aperture $r$ which has been carried through the slot $l$ to the opposite side of the depending member of the lifter $k$.

By the use of open links such as $n$, $n$ it is possible, in addition to the lateral displacement producing parallel motion, to raise either end of the lifter-bar $m$ angularly in a vertical direction and to thus exert considerable leverage to force the lifter $k$ upward in the event of there being tension on the couplings when it is desired to uncouple the vehicles.

The above described construction of coupling permits of a certain amount of play between the buffer faces of two coupled vehicles, this "slack coupling" thus rendering the construction particularly suitable for "goods" or other rolling stock not destined to travel at high speeds or for specially important purposes.

Referring to Figs. 4 and 9 inclusive: Instead of forming a stationary draw-hook $c$ within the buffer $a$, a rotary disk-hook 1 formed integrally with trunnions 2, 2, is mounted in hook-shaped bearings 3 integral with the inner walls of each buffer head $a$; said buffer head being slotted longitudinally at the bottom to permit of the insertion of the disk-hook.

A light retaining bolt 4 (upon which none of the strains imparted to the coupling are imposed) secured by a nut, passes loosely through an axial slot in each disk-hook 1 and through corresponding apertures $4^a$ formed in the body of each buffer $a$. Instead of a bolt a rivet or a pair of set screws may be used.

Each disk-hook 1, as is well known, is adapted to be moved angularly into operative position by an incoming link or shackle $g$ upon the opposing vehicle striking same when two vehicles come together.

In order to lock the disk-hook 1 in said operative position each hook is notched or gapped peripherally as at 5 and a crescent-shaped latch bolt 6 mounted pivotally upon a bolt or stud $6^a$ passing through a depending lug 7 formed beneath each buffer $a$ is adapted to engage with said notch or gap 5, said crescent shaped latch-bolt 6 being controlled by a gravity-operated lever 8 attached thereto and provided near its outer extremity with a circular disk or other counterweight 9.

Owing to the configuration of the latch-bolt the engagement between same and the disk is progressive thus permitting proper locking of the parts even though the disk-hook is rotated suddenly and quickly such as frequently occurs when two vehicles to be coupled come together violently.

In order to prevent locking engagement between the latch-bolt 6 and disk-hook 1, as may be necessary under certain circumstances, such as in uncoupling for shunting purposes a pair of thin metal plates or shutters 10, 10, disposed in shallow recesses formed on the side faces of the disk-hook 1 are mounted pivotally upon a pin 11 passing through the disk-hook 1 at a point adjacent to the bottom of the peripheral notch or gap 5 therein. These shutters 10, 10, are adapted to move angularly, by gravity, as the disk-hook is rotated rearwardly, so as to mask the notch or gap 5.

When coupling is to be effected, one point or nose of the latch-bolt 6 rests against one of the side faces of the disk-hook 1 with which it makes a light rubbing contact as the disk-hook rotates when struck by an incoming shackle, the gravity-operated lever being then in the horizontal position as shown in Fig. 9. As the disk-hook 1 rotates rearwardly the shutters 10, 10, drop by gravity and obstruct entrance to the notch or gap 5, but the nose of the stationary latch-bolt 6 rubbing lightly against the side face of the disk-hook 1 engages the thickened lower edge of one of these pivotally mounted shutters 10 and brushes same aside as the disk-hook continues to rotate thus obtaining entrance to the notch or gap 5 and locking the disk-hook in operative position, the gravity operated lever 8 assuming a downwardly projecting vertical position as shown in Figs. 5, 8 and 10 and by means of the aforesaid circular disk or counterweight 9 indicates to an attendant that locking of the disk-hook has been effected, said disk or counterweight 9 thus serving as a semaphore arm. The slot through which the aforesaid bolt or stud $6^a$ passes is elongated slightly in order to permit of limited vertical movement of the lever 8 and bolt 6 so that the bolt 6 may move into operative engagement with the disk-hook 1 without binding against the main casting of the buffer $a$. When, however, the strain is put on the coupling this limited vertical movement permits the bolt 6 to rise and abut firmly against the body of the buffer head $a$ without strain on the bolt $6^a$. Each of said gravity-operated levers 8 has attached at its lower end an operating chain or cord 12, Fig. 8, the middle point of which is fastened to said lever 8 and the free extremities of which are carried with sufficient slack to staples or the like on opposite sides of the vehicle.

To uncouple the vehicles, which may be effected by an attendant from either side of the train and without necessity of passing between two adjacent vehicles, either of the extremities of the chains 12 appropriate to the levers 8 of both vehicles are pulled so as to move each lever 8 angularly upward into an approximately horizontal position, as shown in Fig. 9 which has for effect to withdraw each latch-bolt 6 from engagement with each disk-hook 1. Immediately the points of the bolts 6 are clear of gaps 5 the gravity-operated shutters 10, 10, are permitted to fall so as to obstruct or blind said gaps 5. Directly the chains 12 are released the disengaged points of the bolts 6 rest against the side faces of the respective shutters 10 and are thereby prevented from reentering the gaps 5. At this stage the vehicles are still coupled but the couplings are not locked. The vehicles may now be drawn apart and during such movement the links or shackles $g$ $g$ pulling upon the disk-hooks 1 revolve same until they disengage therefrom, when each disk-hook continues to rotate, by gravity and assumes the "open" or "set for coupling" position.

Although differing in several constructional details the two hereinbefore described forms of coupling are so designed as to be capable of inter-coupling with one another as shown in Figs. 10 and 11 which will be found of great service in shunting operations and also where "mixed trains" that is to say part passenger and part goods stock, are employed.

What I claim is:—

In an automatic coupling, a coupling link, trunnions on said link, a distance piece connecting said trunnions disposed eccentrically relatively to said trunnions, a coupling head provided with bearings on which said trunnions can move vertically to such an extent that the said link can extend horizontally over the horizontally extending link of a similar coupling, a lug on said head projecting over said distance piece when said link is in operative position and a coupling hook on said head projecting upwardly to an extent that will enable it to engage the coupling link of a similar coupling that extends horizontally over the said link of said head.

Signed at London, England, this 24th day of April, 1912.

ALLISON DALRYMPLE SMITH.

Witnesses:
  O. J. WORTH,
  O. P. LIDDON.

---

Copies of this patent may be obtained for five cents each, by addressing the "Commissioner of Patents, Washington, D. C."